Patented May 26, 1931

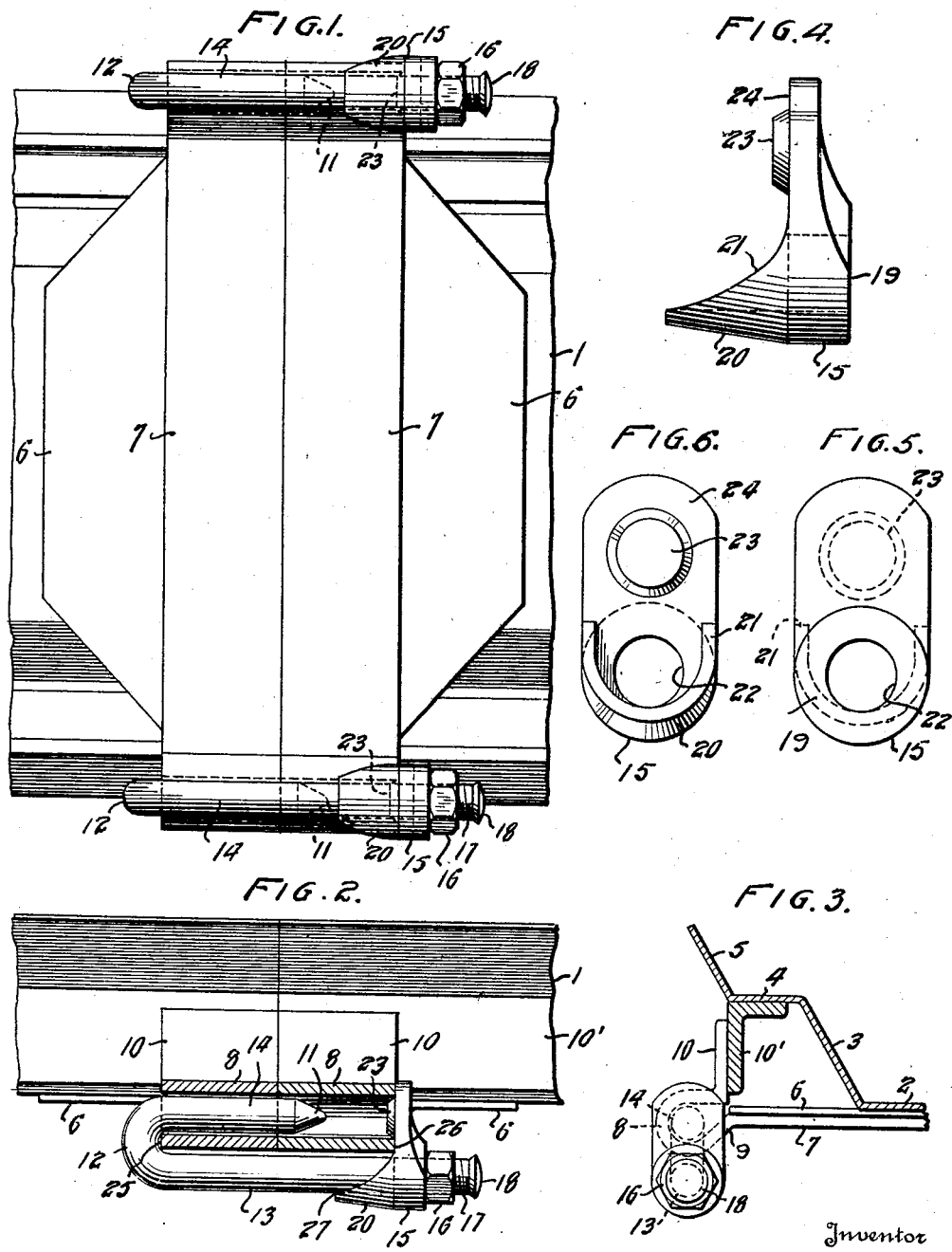

1,807,127

UNITED STATES PATENT OFFICE

ALBION MOULTON, OF PHILADELPHIA, PENNSYLVANIA, ASSIGNOR, BY MESNE ASSIGNMENTS, TO CONVEYOR SALES COMPANY, OF NEW YORK, N. Y., A CORPORATION OF NEW YORK

CONNECTER BOLT

Application filed August 30, 1928. Serial No. 303,014.

This invention relates to improvements in conveyors and pertains especially, though not exclusively, to reciprocating conveyors.

The present invention is an improvement of the device described in copending application Serial No. 117,827, filed June 22, 1926. In the past, many different types of reciprocating conveyors have been proposed. These devices comprise essentially a series of troughs connected together and suspended from chains or mounted on rollers. The several troughs necessary to make up the desired length of conveyor are connected together and are actuated by means of a power source and suitable linkage. A harmonic motion is imparted to the conveyor with the result that the material is moved longitudinally at each reciprocation.

A very important feature of such structures, and one which to a large extent determines their comparative efficiency, is the facility with which they may be assembled and dismantled. In the usual practice the troughs are connected together by passing a bolt, of ordinary construction, through aligned apertures in adjacent troughs to secure the troughs end to end. Nuts are then screwed upon the projecting threaded portions of the bolt and in most cases lock nuts are then attached.

The assemblage of trough sections often takes place on rough and uneven terrain and hence perfect alignment is quite difficult. Since, in such circumstances, the securing bolt will not readily pass through the misaligned apertures, it is the practice to force the bolt into position by hammer blows. It will readily be appreciated that after but a few of such forceful insertion, the threads on the bolts become so battered and distorted that the securing nuts can not be screwed on.

The prior constructions presented another outstanding disadvantage. In assembling the troughs, it is not always possible to secure precise horizontal alignment of the sections. When the sections are thus angularly disposed, it happens that the securing flanges on one side of the troughs may be in abutting relationship while the flanges on the other side are spaced an appreciable distance from each other. This gap of necessity causes misalignment of the flange apertures, and if the bolts are forcibly inserted in position they soon become too battered for use. It is to be observed that in this case of misalignment the securing nuts are crowded out towards the end of the threaded portion, which portion is the first to be distorted under the hammer blows.

It is to be observed further that it requires considerable time to secure the ordinary connecter bolt in position. In such constructions, as has been explained, two nuts are generally employed on each bolt; the first to draw and hold the bolt in position and the second to lock the securing nut in place. Two bolts are generally required to keep a joint between adjacent troughs. The time consumed in emplacing the bolts will be appreciated when it is considered that, as a general rule, the first nut requires approximately nineteen turns to drive it to position, while the second or lock nut requires approximately twelve nut turns. In other words, to secure two adjacent troughs required approximately sixty-two nut turns. Conversely, it requires an equal number to permit removal of the bolts from their respective apertures.

In a structure such as a reciprocating conveyor in which rapid assemblage and detachment of sections is of the essence, the foregoing considerations become of major importance.

It is an object of the present invention to provide an improved connecter element for securing conveyor troughs.

Another object is to provide a connecter element for conveyors which is so designed as to properly align the conveyor parts.

Another object is to provide a connecter of the class described which has a wide permissive adjustment.

A further object is to provide a connecter element in which the threads are effectively protected from distortion.

An additional object is to provide a connecter element for conveyor troughs which is of rugged construction and readily applied and removed.

With these and other important and related objects in view, the invention comprehends the provision of a connecter bolt of special design and construction which may readily be inserted in place and locked in position in a minimum of time.

To enable a ready comprehension of the underlying principles of the invention, a preferred modification is shown in the accompanying drawings, in which:

Figure 1 is a bottom view of two adjacent shaker conveyor troughs.

Figure 2 is a side elevation partly in section of the device shown in Figure 1.

Figure 3 is an end view of the conveyor showing the connecter in its operative position.

Figure 4 is an enlarged detail view of one of the elements of the connecter.

Figure 5 is a one end view of the member shown in Figure 4.

Figure 6 is the other end view of the member shown in Figure 4.

The general characteristics of the present conveyor structure are comparable to those of the device described in the copending application above referred to. The conveyor comprises a plurality of trough sections 1 which are secured together for simultaneous movement in a manner to be described in detail. Each trough is preferably fabricated from a suitable piece of structural metal and includes the bottom or base portion 2 and integral tapering side walls 3. Near the upper end, each wall is laterally displaced so as to present a rigid portion 4 and is then extended in a general oblique direction to provide upper retaining walls 5. It is to be understood that the described design of trough is merely one of the many which may be employed and to all of which the present improvement is applicable.

Near each end, the trough is provided with a reinforcing member of high tensile strength such as the gusset plate 6. This member may be riveted, welded or otherwise suitably fastened to the trough base 2. The gusset plate rigidifies the end of the trough and serves to distribute the stresses to which the trough is subjected over a wide area, as explained fully in the prior application.

Secured to the end of the trough and projecting laterally thereof is a metallic band 7. As shown, this is of appreciable width and is positioned below the gusset plate. The band may be attached to the trough by any suitable securing means which, if desired, may pass through the bores in the plate and the bottom of the trough. The band 7 is formed with a longitudinal aperture 8 for the reception of the connecters. This aperture may conveniently be made by forming a bead 9 at the edge of the band and then extending the remaining portions of the band upwardly to provide the vertical flange 10.

In order to insure a sturdy structure and prevent relative movement between the upper portion of the trough and the band 7, a reinforcing member may be provided. As shown, this may take the form of an angle iron 10′, the flanges of which are suitably secured to the ledge 4 and extension 10 respectively.

It will be observed upon inspection of Figures 2 and 3, that the bead 9 projects laterally and downwardly from the trough and hence is in a readily accessible position. Likewise, it will be noted that an edge of the band 7 is substantially flush with the end of the trough. In assembling, two troughs are juxtaposed so that the adjacent edges of the bands 7 abut and the apertures 8 of each band are in horizontally aligned relationship. When in this position, the parts may be secured together by passing a locking means through the apertures.

As has been explained, it has been the practice to employ a straight bolt for connecting the two troughs. The disadvantages of such a mode of attachment have been fully explained. I have found that these disadvantages can be obviated by employing the novel connecter, shown particularly in Figure 2.

This comprises preferably a piece of rounded steel tapered at the end 11 and bent at the portion 12 to present the two legs 13 and 14. It will be noted that the leg 14 is of sufficient length to project entirely through one of the apertures 8 and well into the second juxtaposed aperture.

The outside leg 13 is such a length as to extend beyond the combined width of the two bands 7 to permit the reception of a clamping bracket 15 and the securing nut 16. The shank 13 is formed with a threaded portion 17 sufficiently long to provide for any adjustment necessitated by faulty alignment of adjacent troughs. The bolt, clamping bracket and securing nut are made up of an operative unit in which the several parts are maintained in their operative associated relationship. This may be done, in manufacture, by first continuing the threads 17 along to the end of the shank 13 and then after emplacing the connecter 15 and nut 16, peining the end 18. The headed portion 18, therefore, effectively prevents removal of the clamping bracket.

The clamping bracket is constructed of a suitable metal of sufficient strength and may be, for example, a steel forging or casting. As shown, this includes the body portion 15, which at one end is provided with a flat surface 19 on which the tightening nut 16 is seated. The bracket is extended longitudinally on one side to present the wing or leg 20, which is joined to the body section 15 by the arcuate flanges or ribs 21.

The connecter 15 is bored to present the aperture 22 through which the leg 13 passes. It is to be noted that the interior of the wing 20, substantially coincides, at one point in its curvature, with the curve described by the aperture 22, so that in one place the wing 20 and body portion 15 are continuous, and present a single elongated bearing for the shank 13. Laterally aligned with the aperture 22 is a projecting boss 23. This boss is preferably of tapered construction so as to facilitate its insertion in the aperture 8 of the trough band. It will be seen from the several figures that the center of the boss is aligned with the short leg 14, and cooperates therewith to lock the troughs together.

The operation of the device will be appreciated from the foregoing description. When it is desired to assemble the conveyor, two troughs 1 and 1 are first brought into rough or approximate alignment, the tapered end 11 of the connecter is inserted in one of the apertures 8 and the inside leg 14 driven home by a blow of a hammer on the curved portion 12. During this movement, the adjacent troughs are brought into alignment. The clamping bracket 15 is then swung into position and the boss 23 is seated in the now aligned aperture 8 of the second trough.

It will be observed that since the boss is tapered and relatively short, it may quickly be disposed in its receiving aperture. Due to the short length of the boss, it will require only four or five turns of the nut 16 to draw the bracket up tightly against the edge of the ledge 9. It will be observed that this ledge has bearing engagement with the bottom face 24 of the bracket throughout its length. In these circumstances the connecter bolt will exert pressure upon the ledges 9 of each band at the points 25 and 26 which are in substantial alignment. Similarly, pressure at the points 25 and 26 will effect a similar pressure at the point 27, between the outside leg 13 of the connecter bolt and the wing 20 of the bracket. It is to withstand this pressure that the lengthened leg 26 is provided.

To disengage the connecter the nut is loosened and the clamping bracket is turned on the bolt shank to disengage the boss 23 from aperture 8. Should the boss have become tightly engaged or stuck in the aperture a light hammer blow will effect its disengagement. Another light hammer blow on the peined end will drive the short leg 14 out of the aligned aperture 8 and permit complete disengagement of adjacent troughs. It will be seen that it requires only four nut turns on each connecter to effect an engagement or disengagement. In assembling and disconnecting a particular trough, it requires, therefore, only approximately sixteen nut turns as compared to about one hundred thirty-four turns which was necessary in prior constructions.

It is to be noted additionally that the peined end 18 protects the threads of the bolt from hammer blows and that the threads, furthermore, are not subjected to abrading or disruptive contact with the trough flanges as is the case in prior devices. With the present construction, the short leg 14 is the one which is forced through the aperture and which effects the aligning of the troughs. Since this is a smooth and tapered member, it presents less resistance to forcible insertion than a threaded or corrugated surface, and hence assures additional facility and speed in assemblage.

In the prior structures it was found desirable to provide a shoulder or projection on the bolt shank which was adapted to engage a section of the trough flange to prevent rotation of the bolt during the emplacement of the nut. Since in the present structure the leg 13 is offset from the apertures 8, there is less tendency of the connecter to turn, but should such a turning moment develop, it would be effective for only a very short distance. That is to say, until the leg 13 abutted the vertical extension 10.

It should be observed that the described connecter is very effective in aligning the troughs. Should the cross bands 7 fail to meet by reason of improper alignment, the forcible insertion of the inside leg, by means of a hammer blow will tend to bring the two bands together. By rotating the nut backwardly a few more turns than is customary the clamping bracket may be retracted any additional distance which is necessary to permit the boss 23 to clear the band 7 and swing into its position of engagement with aperture 8. Thereafter the two bands may be drawn together by rotation of the nut.

Finally it is to be observed that the present device subserves an additional and useful function. Occasionally it is desirable to actually institute a bend or angle between two adjacent troughs. In such circumstances the adjustable length of the connecter is of peculiar value. The connecter is inserted in the band apertures and the troughs are laid in such position as will give the desired bend or angularity. Open washers are then dropped in position over the inside leg of the connecter. Such a number of washers may be inserted as will fill the space or gap which is desired to be established. The clamping bracket is retracted to its position of clearance with respect to the trough band, and then swung into its position of engagement. The securing nuts may then be screwed home in the manner described. The connecter is therefore of adjustable length and it is not only operable to draw the troughs into straight alignment, but also to permit an angular or bent assemblage.

While I have shown and described a preferred embodiment of the invention, it is to be understood that this is given merely to exemplify the underlying principles of the invention for, since these may be incorporated in other specific structures, I do not intend to be limited to that which is shown, except as such limitations are clearly imposed by the appended claims.

I claim:

1. A conveyor mechanism comprising a plurality of troughs having eyelets adapted to be aligned secured thereto, and means to connect the troughs comprising a member having relatively slidably aligned parts adapted to engage the eyelets.

2. A conveyor mechanism comprising a plurality of troughs having apertured securing plates attached thereto, adapted to be aligned means to connect the troughs including a shank adapted to project into the apertured plate on one of the troughs securing plates, a member slidably mounted on the shank adapted to fit in the apertured plate on the other trough and means to lock the slidable member shank in engagement with the securing plates to connect the troughs.

3. A connecter comprising a threaded shank having a reversely bent portion and a member pivotally mounted on the shank the reversely bent portion on the shank being adapted to be aligned with a projection formed on the pivotally mounted member to act as a connecter by movement of the pivotally mounted member toward the end of the reversely bent portion of the shank.

4. A connecter for insertion in aligned eyelets comprising a threaded shank having a reversely bent portion, a member rotatably mounted on the shank and extending laterally thereof and a projection near the outer end of said member the end of the reverse portion of the shank and the projection on the rotatable member being adapted to be inserted in the aligned eyelets.

5. A trough connecter comprising two integral spaced substantially parallel sections of differential length one section being adapted to receive a collar having a boss formed thereon in alignment with the other section.

6. A connecter for troughs having bands at adjacent ends formed with eyelets on the sides comprising two integral spaced sections of differential length, a tapered end on the shorter section adapted to be forcibly inserted into an eyelet carried by one of the troughs, a collar on the longer section adapted to move circumferentially and longitudinally of the connector and means carried by the collar adapted to be aligned with the end of the tapered section for insertion in the adjacent eyelet carried by the other trough.

7. A connecter for troughs having eyelets connected to the sides thereof on adjacent ends comprising a threaded bolt, an integral section projecting laterally of the bolt and adapted to engage in an eyelet on one of the troughs, a separate section loosely mounted on the bolt and in the aligned eyelet on the adjacent trough having a projection adapted to be brought into substantial alignment with the said projecting portion and means to lock the said separate section in positive engagement.

8. A connecter for troughs having eyelets fixed on the sides adjacent the ends comprising a shank having substantially parallel integral sections, one of which is adapted to be inserted in an eyelet on the side of one trough a threaded portion on the other of said sections, a peined end protecting said threaded portion and a collar carried on the shank by the end of the parallel section and the threaded portion, having a projection adapted to be aligned with the end of the section inserted in one eyelet of the trough, and inserted in the aligned eyelet on the adjacent trough.

In testimony whereof I affix my signature.

ALBION MOULTON.